Patented Nov. 19, 1935

2,021,384

UNITED STATES PATENT OFFICE 2,021,384

REMOVAL OF ACID FROM PEROXIDE SOLUTIONS

Joseph S. Reichert, Niagara Falls, N. Y., assignor to E. I. du Pont de Nemours & Company, Wilmington, Del., a corporation of Delaware No Drawing. Application June 7, 1933, Serial No. 674,775

17 Claims. (Cl. 23—207)

This invention relates to the treatment of hydrogen peroxide solutions, and more particularly to the removal of sulfuric acid from such solutions.

Hydrogen peroxide solutions, for example, those prepared by electrolysis of sulfuric acid, followed by distillation of the persulfuric acid produced by the electrolysis, usually contain an excess of sulfuric acid. In addition, such solutions commonly contain certain impurities which act catalytically to cause decomposition of the hydrogen peroxide. These catalytic impurities comprise ions of heavy metals or heavy metal compounds in colloidal suspension. Purchasers of high-grade hydrogen peroxide solutions demand a material which is not highly acid and which contains a minimum of the aforesaid catalytic impurities.

Heretofore, the excess sulfuric acid has been removed from hydrogen peroxide solutions by neutralizing with alkaline materials, for example, sodium hydroxide or sodium bicarbonate. This method of neutralization results in the formation of a soluble metal sulfate which it is not practicable to remove from the peroxide solution. One method of determining the purity of a hydrogen peroxide solution comprises evaporating a sample to dryness and determining the amount of non-volatile material present. Purchasers have demanded that there be little or no non-volatile material in the hydrogen peroxide; hence, the presence of a soluble, non-volatile metal sulfate is objectionable.

An object of this invention is to produce a hydrogen peroxide solution which has a relatively low acidity and which contains little or no non-volatile material. A further object is to provide a means for decreasing the amount of catalytic impurities in hydrogen peroxide solutions. Other objects will be hereinafter apparent.

These objects are attained according to the present invention by treating the peroxide solution with barium hydroxide or other basic barium compound to precipitate part of the sulfuric acid as barium sulfate, while limiting the amount of barium compound used so that the resulting solution will contain little or no dissolved barium. If the proper amount of the basic barium compound is used, substantially no barium ions remain in the solution after the maximum amount of excess sulfuric acid is removed by its precipitation as barium sulfate. I have discovered that in order to avoid any excess of barium ions after precipitation of the sulfate ions as barium sulfate, it is essential that the addition of the barium compound to the solution be stopped when the acidity has been reduced to a limiting pH value, specific for each peroxide solution, in the pH range of 1.5 to 2.5. From this discovery it is apparent that the reaction of barium ions with sulfate ions occurs in a somewhat different manner in hydrogen peroxide solutions than in water alone, for one may add a basic barium compound to a peroxide-free, water solution of sulfuric acid until a pH of substantially 7 has been reached before an excess of barium ions will remain in the solution after the barium sulfate has been precipitated and removed.

I have further discovered that if a basic barium compound is added to a hydrogen peroxide solution containing sulfuric acid until the pH has reached a limiting value in the pH range 3.5 to 6, the concentration of barium remaining in solution will not exceed around 0.2 gram per liter.

The following examples illustrate the above-described effect of the pH on the precipitation of barium sulfate in hydrogen peroxide solutions:

Example I

To a sample of a 100-volume hydrogen peroxide solution containing excess sulfuric acid, sufficient of a saturated solution of barium hydroxide was added at a temperature of about 70° C. to reduce the acidity to a pH of 1.8. Another sample of the same hydrogen peroxide was treated with barium hydroxide solution under the same conditions, except that the pH was reduced to 2.2. In each case a precipitate of barium sulfate was formed. Both samples were filtered and to each filtrate was added a large excess of ammonium sulfate. The ammonium sulfate test resulted in the formation of a slight precipitate in the sample having a pH of 2.2, while no precipitate formed in the sample having a pH of 1.8, showing that in the latter case there were substantially no barium ions present.

Example II

Samples of 100-volume hydrogen peroxide solution made by hydrolysis of persulfuric acid and which contained free sulfuric acid were treated with varying amounts of barium hydroxide solution. The precipitated barium sulfate was filtered out, the pH of the filtrates was determined, and each filtrate was analyzed for dissolved barium. The following results were obtained:

| Sample | Filtrate | |
|---|---|---|
| | pH | Dissolved barium |
| 1 | 1.8 | None. |
| 2 | 2.1 | Trace. |
| 3 | 3.4 | 0.480 grams/liter of Ba. |
| 4 | 4.5 | 0.0610 grams/liter of Ba. |
| 5 | 6.0 | 0.1017 grams/liter of Ba. |

I have also discovered that the precipitation of barium sulfate in hydrogen peroxide solutions is effective in decreasing catalytic impurities therein; when such impurities are present in relatively small amounts, they may be substantially completely removed by the barium sulfate precipitation. When larger amounts of catalytic impurities are present, they may be removed by precipitating a small amount of a colloidal material, for example, stannic acid or aluminum hydrate, either simultaneously with the barium sulfate or after removing the barium sulfate precipitate. I have further found that the co-precipitation of such colloidal material with barium sulfate assists in making the barium sulfate precipitation more complete and produces a precipitate which generally is more readily removed by filtration or decantation than barium sulfate precipitated alone. The amount of colloidal material required for such co-precipitation in general will be considerably less than that required for complete removal of catalytic impurities. Hence, in one method of practicing my invention, I may co-precipitate barium sulfate and a small amount of colloidal material, filter off the combined precipitates and then precipitate a larger amount of colloidal material to complete the removal of catalytic impurities.

According to another method of carrying out my invention, a saturated solution of barium hydroxide is added to a hydrogen peroxide solution containing excess sulfuric acid until the acidity of the solution is decreased to a point equivalent to a pH of not over 1.8 and the resulting precipitate of barium sulfate is removed by decantation or filtration.

A preferred method of practicing my invention is illustrated by the following example:

*Example III*

An acidic 100-volume solution of hydrogen peroxide, resulting from the hydrolysis of persulfuric acid, is partially neutralized by the addition of sufficient barium hydroxide or barium carbonate to lower the acidity to a pH of 1.7 or 1.8. A small amount of a colloidal stannic oxide sol (made by peptizing a colloidal precipitate of stannic acid with ammonia), equivalent to around 0.2 gram of $SnO_2$ per liter of solution, is added and the precipitate, consisting of barium sulfate and a small amount of stannic acid, is removed by filtration. The acidity of the filtrate then is further decreased to a pH of 2.4 to 2.6 by the addition of sodium hydroxide or ammonium hydroxide. Colloidal stannic oxide sol, equivalent to about 0.3 gram of $SnO_2$ per liter is then stirred in and, after settling, the precipitate of stannic hydroxide is filtered off. The resulting filtrate is of satisfactory acidity, is substantially free from catalytic impurities and contains a minimum of non-volatile materials.

If desired, an excess of the barium compound beyond that required to reduce the acidity to a pH of 1.8 may be added; for example, sufficient may be added to bring the acidity to a pH of around 4 to 6. This procedure will leave a small excess of barium ions in the solution, usually not more than around 0.2 gram of Ba per liter. I have found that the presence of such a small amount of excess barium ions has substantially no deleterious effect on the stability of purified hydrogen peroxide solutions; hence, its presence ordinarily is not objectionable, provided there is no objection to this small amount of non-volatile material in the solution. The amount of non-volatile material introduced by the addition of this small excess of barium ions is much less than that formed by the usual neutralization method; e. g., by addition of NaOH.

If sufficient barium compound is added to increase the pH of the solution materially above a pH of around 4 to 6, the amount of barium remaining in solution becomes increasingly greater and the resulting peroxide solution is unfit for many purposes where a small amount of barium would not be objectionable.

Although I have found that to avoid an excess of soluble barium in the particular hydrogen peroxide solutions investigated by me it is necessary not to exceed the limiting pH value of about 1.8, my invention is not restricted to this particular pH limit, since it is possible that with hydrogen peroxide solutions from other sources, the complete precipitation of the barium may occur at somewhat higher or lower limiting pH values. Also, this limiting pH value obviously will vary somewhat according to the strength of the hydrogen peroxide solution and in general will be higher in the more dilute peroxide solutions. However, in any case I prefer not to add more of the basic barium compound than that amount which will increase the pH of the solution to a pH higher than 4.0 to 6.0. In other words, in the application of my invention to any hydrogen peroxide solution, there will be two limiting acidity values (a) a lower preferable pH value, which in general will fall in the pH range of 1.5 to 2.5, which must not be exceeded if it is desired to avoid having any substantial amount of dissolved barium in the treated solution, and (b) an upper value, in the pH range of 3.5 to 6.0, below which small amounts of dissolved barium (e. g., not more than about 0.2 gram per liter) will occur in the treated solution. In each case, the limiting pH value is easily determined by treating samples and applying a test like that described in Example II; that is, by precipitating barium sulfate at different pH values, filtering and analyzing the filtrate for soluble barium.

In place of a saturated solution of barium hydroxide, finely divided solid barium hydroxide, barium oxide, barium peroxide, or barium carbonate may be used to precipitate the barium sulfate. I have found that the barium sulfate precipitate alone removes catalytic impurities up to a certain extent; hence, if the amount of such impurities is not excessive, the solution may be entirely rid of them by this treatment.

The catalytic impurities are precipitated or adsorbed by the precipitated stannic acid or similar colloidal precipitate and also to a smaller extent by the barium sulfate precipitate and thus are removed from the solution. After such precipitation it is not essential that the precipitate be removed from the solution, provided that conditions are such that subsequent solution of the precipitate will not occur; under such conditions, the adsorbed or precipitated catalytic impurities will not reenter the solution. However, I prefer to remove the precipitate by any suitable method; e. g., filtration, decantation, or centrifuging, since the presence of undissolved solids is often objectionable.

The amount of stannic acid or other colloidal material to be precipitated will depend upon the amounts of catalytic impurities to be removed; and the minimum amounts required may be determined in each case by simple trials. There is no disadvantage in precipitating such materials in a substantial excess. I have obtained excellent results by precipitating stannic acid in amounts equivalent to 0.1 to 1.2 grams of SnO₂ per liter of hydrogen peroxide solution.

The precipitation of stannic acid may be effected by adding a suitable tin compound; e. g., a soluble tin salt, a soluble metal stannate, or a colloidal stannic oxide sol, to the acidic hydrogen peroxide solution. It is preferable to have the acidity of the solution at a pH of 2.0 to 3.5 at the time of precipitation, in order to obtain complete precipitation and to remove the maximum quantity of the catalytic impurities. I prefer to precipitate stannic acid by adding to the solution a colloidal sol of stannic oxide at a pH of 2.4 to 2.6 as illustrated by Example III, above. One method of preparing a suitable sol consists in peptizing freshly precipitated stannic acid with an alkaline reagent; e. g., ammonium hydroxide or sodium hydroxide. An advantage in using the sol resides in the fact that it introduces little or no soluble, non-volatile matter into the solution and has little or no effect upon the acidity of the solution to which it is added. Although the sol will have an alkaline reaction, the amount of alkali present ordinarily will be so small that the addition of the required amount of the sol will have substantially no effect upon the pH of the peroxide solution.

The method comprising precipitating stannic acid in hydrogen peroxide solutions at a pH above 1.4 or preferably at a pH of 2.0 to 3.5, to remove catalytic impurities is disclosed and claimed in my co-pending application S. N. 655,481.

I claim:

1. A process for treating a solution of hydrogen peroxide containing sulfuric acid which comprises the steps of adding to said solution a basic barium compound and a substance capable of forming in said solution a colloidal precipitate, said barium compound being added in an amount such that the resulting solution, after removal of the precipitate will contain not more than 0.2 gram of dissolved barium per liter; and then removing the resulting precipitate from said solution.

2. A process for treating a solution of hydrogen peroxide containing sulfuric acid which comprises the steps of adding to said solution barium hydroxide and a soluble tin compound, said barium hydroxide being added in such an amount that the resulting solution, after removal of the precipitate, will contain not more than 0.2 grams of dissolved barium per liter; and then removing the resulting precipitate from said solution.

3. A process for treating a solution of hydrogen peroxide containing sulfuric acid which comprises the steps of adding to said solution barium hydroxide and stannic oxide sol, the said barium hydroxide being added in such amount that the resulting solution after removal of the precipitate will contain not more than 0.2 gram of dissolved barium per liter; and then removing the resulting precipitate from said solution.

4. A process for treating a solution of hydrogen peroxide containing sulfuric acid which comprises the steps of adding to said solution barium carbonate and stannic oxide sol, the said barium carbonate being added in such amount that the resulting solution, after removal of the precipitate, will contain not more than 0.2 gram of dissolved barium per liter; and then removing the resulting precipitate from said solution.

5. A process for treating a solution of hydrogen peroxide containing sulfuric acid and having a pH value of substantially less than 6.0 comprising adding thereto sufficient of a basic barium compound to reduce the acidity of the solution to a pH value greater than the initial value but not greater than about 6.0.

6. A process for treating a solution of hydrogen peroxide containing sulfuric acid and having a pH value of substantially less than 6.0 comprising adding thereto sufficient barium hydroxide to reduce the acidity of the solution to a pH value greater than the initial value but not greater than about 6.0, and removing the resulting precipitate of barium sulfate.

7. A process for treating a hydrogen peroxide solution containing sulfuric acid and leaving a pH value substantially less than 1.8 comprising adding thereto sufficient barium hydroxide to reduce the acidity of the solution to a pH value greater than the initial value but not greater than about 1.8 and removing the resulting precipitate of barium sulfate.

8. A process for treating a solution of hydrogen peroxide containing sulfuric acid and having a pH value of substantially less than 6.0 comprising adding thereto sufficient barium carbonate to reduce the acidity of the solution to a pH value greater than the initial value but not greater than about 6.0, and removing the resulting precipitate of barium sulfate.

9. A process for treating a solution of hydrogen peroxide containing sulfuric acid and having a pH value of substantially less than 6.0 comprising adding thereto sufficient of a basic barium compound to reduce the acidity of the solution to a pH value greater than the initial value but not greater than about 6.0, adding stannic oxide sol, and removing the resulting precipitates of barium sulfate and stannic hydroxide, together with the catalytic impurities associated therewith.

10. A process for treating a solution of hydrogen peroxide containing sulfuric acid and having a pH value of substantially less than 6.0 comprising adding thereto sufficient of a basic barium compound to reduce the acidity of the solution to a pH value greater than the initial value but not greater than about 6.0, removing the resulting precipitate of barium sulfate, and thereafter precipitating a colloidal substance in said solution and removing said colloidal precipitate, together with the catalytic impurities associated therewith.

11. A process for treating a hydrogen peroxide solution containing sulfuric acid and having a pH value substantially less than 1.8 comprising adding thereto sufficient barium hydroxide to reduce the acidity of the solution to a pH value greater than the initial value but not greater than about 1.8, removing the resulting precipitate of barium sulfate and thereafter precipitating stannic hydroxide in said solution and removing said precipitated stannic hydroxide together with the catalytic impurities associated therewith.

12. A process for treating a hydrogen peroxide solution containing sulfuric acid and having a pH value substantially less than 1.8 comprising adding thereto sufficient barium carbonate to reduce the acidity of the solution to a pH value greater than the initial value but not greater than about 1.8, removing the resulting precipitate of barium sulfate and thereafter precipitating stannic hydroxide in said solution and removing said precipitated stannic hydroxide together with the catalytic impurities associated therewith.

13. A process for treating a hydrogen peroxide solution containing sulfuric acid and having a pH value substantially less than 1.8 comprising adding thereto sufficient barium hydroxide to reduce the acidity of the solution to a pH value greater than the initial value but not greater than about 1.8, removing the resulting precipitate of barium sulfate, adding sufficient alkali to further decrease the acidity of the solution to a pH of 2.2 to 3.5 and thereafter precipitating stannic hydroxide in said solution and removing said precipitated stannic hydroxide together with the catalytic impurities associated therewith.

14. A process for treating a hydrogen peroxide solution containing sulfuric acid and having a pH value substantially less than 1.8 comprising adding thereto sufficient barium hydroxide to reduce the acidity of the solution to a pH value greater than the initial value but not greater than about 1.8, removing the resulting precipitate of barium sulfate, adding sufficient ammonium hydroxide to further decrease the acidity of the solution to a pH of 2.2 to 3.5 and thereafter adding to said solution stannic oxide sol to said solution to precipitate stannic hydroxide therein.

15. A process for treating a hydrogen peroxide solution containing sulfuric acid and having a pH value substantially less than 1.8 comprising adding thereto sufficient barium hydroxide to reduce the acidity of the solution to a pH value greater than the initial value but not greater than about 1.8, removing the resulting precipitate of barium sulfate, adding sufficient ammonium hydroxide to further decrease the acidity of the solution to a pH of 2.2 to 3.5 and thereafter adding to said solution stannic oxide sol in an amount equivalent to 0.1 to 1.2 grams of $SnO_2$ per liter of said solution to precipitate stannic hydroxide therein and removing said precipitated stannic hydroxide together with the catalytic impurities associated therewith.

16. A process for treating a hydrogen peroxide solution containing sulfuric acid and having a pH value substantially less than 1.8 comprising adding thereto sufficient barium carbonate to reduce the acidity of the solution to a pH value greater than the initial value but not greater than about 1.8, removing the resulting precipitate of barium sulfate, adding sufficient ammonium hydroxide to further decrease the acidity of the solution to a pH of 2.2 to 3.5 and thereafter adding to said solution stannic oxide sol in an amount equivalent to 0.1 to 1.2 grams of $SnO_2$ per liter of said solution to precipitate stannic hydroxide therein and removing said precipitated stannic hydroxide together with the catalytic impurities associated therewith.

17. A process for treating a hydrogen peroxide solution containing sulfuric acid and having a pH value substantially less than 1.8 comprising adding thereto sufficient barium hydroxide to reduce the acidity of the solution to a pH value greater than the initial value but not greater than about 1.8, and a small amount of stannic oxide sol, removing the resulting precipitate, adding sufficient ammonium hydroxide to further decrease the acidity of the solution to a pH of 2.4 to 2.6, and thereafter adding to said solution stannic oxide sol in an amount equivalent to 0.1 to 1.2 grams of $SnO_2$ per liter of said solution to precipitate stannic hydroxide therein and removing said precipitated stannic hydroxide together with the catalytic impurities associated therewith.

JOSEPH S. REICHERT.

CERTIFICATE OF CORRECTION

Patent No. 2,021,334. November 19, 1935.

JOSEPH S. REICHERT.

It is hereby certified that error appears in the printed specification of the above numbered patent requiring correction as follows: Page 1, second column, line 54, in the table, for "0.480" read 0.0480; page 3, second column, line 14, claim 7, for "leaving" read having; and that the said Letters Patent should be read with these corrections therein that the same may conform to the record of the case in the Patent Office.

Signed and sealed this 17th day of December, A. D. 1935.

Leslie Frazer (Seal) Acting Commissioner of Patents.